(12) United States Patent
Choi

(10) Patent No.: US 9,093,888 B2
(45) Date of Patent: Jul. 28, 2015

(54) LINEAR VIBRATOR

(75) Inventor: Jun Kun Choi, Gyunggi-do (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 671 days.

(21) Appl. No.: 13/064,800

(22) Filed: Apr. 15, 2011

(65) Prior Publication Data
US 2011/0291497 A1    Dec. 1, 2011

(30) Foreign Application Priority Data

May 25, 2010   (KR) .................. 10-2010-0048815

(51) Int. Cl.
*H02K 33/18*   (2006.01)

(52) U.S. Cl.
CPC ........................ *H02K 33/18* (2013.01)

(58) Field of Classification Search
USPC ......... 310/15, 17, 25, 36; 340/407.1; 381/396
See application file for complete search history.

(56) References Cited

U.S. PATENT DOCUMENTS

| | | | | |
|---|---|---|---|---|
| 7,038,335 B2* | 5/2006 | Choi et al. | | 310/12.24 |
| 7,170,205 B2* | 1/2007 | Won et al. | | 310/36 |
| 7,576,462 B2* | 8/2009 | Miura | | 310/89 |
| 7,619,498 B2* | 11/2009 | Miura | | 335/222 |
| 8,130,086 B2* | 3/2012 | Choi et al. | | 340/407.1 |
| 8,134,259 B2* | 3/2012 | Choi | | 310/25 |
| 8,450,887 B2* | 5/2013 | Chung et al. | | 310/25 |
| 8,461,729 B2* | 6/2013 | Jeon | | 310/25 |
| 2005/0184601 A1* | 8/2005 | Kweon et al. | | 310/36 |
| 2007/0182257 A1 | 8/2007 | Miura et al. | | |
| 2007/0194635 A1* | 8/2007 | Miura | | 310/15 |
| 2008/0306332 A1* | 12/2008 | Choi et al. | | 600/38 |
| 2009/0121559 A1 | 5/2009 | Lee | | |

FOREIGN PATENT DOCUMENTS

| | | |
|---|---|---|
| JP | 2001-340811 | 12/2001 |
| JP | 2007-203227 | 8/2007 |
| KR | 10-2005-0083528 | 8/2005 |
| KR | 10-2008-0074329 | 8/2008 |
| KR | 10-2009-0048677 | 5/2009 |
| KR | 10-0895993 | 5/2009 |
| KR | 10-0898017 | 5/2009 |
| KR | 10-0923867 | 10/2009 |
| KR | 10-0934584 | 12/2009 |
| KR | 10-2010-0052753 | 5/2010 |

OTHER PUBLICATIONS

Chinese Office Action issued Apr. 3, 2013 in corresponding Chinese Patent Application No. 201110145215.9.
Korean Office Action dated Mar. 13, 2012 issued in related Korean Patent Application No. 10-2010-0101539.

(Continued)

*Primary Examiner* — Tran Nguyen

(57) ABSTRACT

There is provided a linear vibrator including a fixing unit having a magnet in an inner space of a certain size, the magnet generating magnetic force; a vibration unit including a coil disposed to face the magnet and generating electromagnetic force by interaction with the magnet, and a holder coupled with a surface of the coil and fixedly supporting a mass body which vibrates; and an elastic member coupled with the holder and the fixing unit and providing elastic force to the vibration unit.

12 Claims, 5 Drawing Sheets

(56) References Cited

OTHER PUBLICATIONS

Chinese Office Action mailed Dec. 16, 2013 in corresponding Chinese Application No. 201110145215.9.
U.S. Application Office Action dated Sep. 29, 2014 in copending U.S. Appl. No. 14/150,232.
Notice of Allowance mailed Feb. 23, 2015 in related U.S. Appl. No. 14/150,232.
English Translation of Korean Reference No. 10-0923867.
Korean Office Action issued May 14, 2015 in corresponding Korean Patent Application No. 10-2013-0064297.

* cited by examiner

LINEAR VIBRATOR

CROSS-REFERENCE TO RELATED APPLICATIONS

This application claims the priority of Korean Patent Application No. 10-2010-0048815 filed on May 25, 2010, in the Korean Intellectual Property Office, the disclosure of which is incorporated herein by reference.

BACKGROUND OF THE INVENTION

1. Field of the Invention

The present invention relates to a linear vibrator, and more particularly, to a linear vibrator achieving stable linear vibrations by preventing vibrations in a horizontal direction.

2. Description of the Related Art

In recent years, a personal mobile terminal having a large liquid crystal display (LCD) screen for a user's convenience has been increasingly released onto the market. In line with this trend, a touch screen type display device has been greatly favored, and a vibration motor has been used so as to generate vibrations when a touch is applied to a touch screen.

A vibration motor transforms electrical energy into mechanical energy using a principle of generating electromagnetic force, is mounted on a personal mobile terminal, and is used for silent call reception notification.

According to the related art, rotatory power is generated to rotate a rotational part of an unbalance mass, thereby obtaining mechanical vibrations. In this case, rotatory power is generated such that it is subjected to a rectifying action through a brush and a contact point of a commutator (or rectifier) to obtain mechanical vibrations.

However, in the brush type structure using a commutator, when the motor rotates, the brush passes through a gap between segments of the commutator, causing mechanical friction and an electrical spark, producing foreign objects and thereby shortening the life span of the motor.

In addition, because voltage is applied to the motor by using a moment of inertia, time is taken to reach a target amount of vibrations, so it is difficult to implement vibrations suitable for a touch screen.

In order to overcome such disadvantages in terms of the life span and response of the motor and implement the vibration function of the touch screen, a linear vibrator is increasingly being used.

A linear vibrator, rather than using the rotational principle of the motor, uses the following principle: when electromagnetic force, obtained by using a spring installed inside a vibration motor and a mass body hung on the spring, is generated periodically in conformity with a resonance frequency, resonance is caused, thereby generating vibrations.

However, in a case in which the mass body performs an abnormal operation or unstable vibrations due to an external impact, this impact affects the coupling portion of the spring and the mass body, and accordingly this may cause defects such as disconnection of a coil. A vibration unit including the spring or the mass body may be separated from its preset position.

Therefore, techniques for preventing impact induced by an external force to generate stable linear vibrations are required. Also, a study for a linear vibrator capable of stopping vibrations quickly and stably is urgently needed.

SUMMARY OF THE INVENTION

An aspect of the present invention provides a linear vibrator preventing a vibration unit from making abnormal vibrations and being separated from a preset position thereof due to external force by changing a coupling structure of an elastic member and a holder supporting a mass body.

According to an aspect of the present invention, there is provided a linear vibrator including: a fixing unit having a magnet in an inner space of a certain size, the magnet generating magnetic force; a vibration unit including a coil disposed to face the magnet and generating electromagnetic force by interaction with the magnet, and a holder coupled with a surface of the coil and fixedly supporting a mass body which vibrates; and an elastic member coupled with the holder and the fixing unit and providing elastic force to the vibration unit.

The holder may include a vertical portion being in contact with the surface of the coil and having a shape of a cylinder, and a horizontal portion extending from an end of the vertical portion in an outer diameter direction and fixedly supporting the mass body.

The elastic member may be coupled with the horizontal portion.

The holder may include a vertical portion being in contact with the surface of the coil and having a shape of a cylinder of which a lower portion is sealed, and a horizontal portion extending from an end of the vertical portion in an outer diameter direction and fixedly supporting the mass body.

The elastic member may include a plurality of elastic members, each of which is individually coupled with the sealed lower portion of the vertical portion and the horizontal portion.

The elastic member may be coupled with the holder by welding.

The elastic member and the holder may be formed of the same material.

The magnet may be in contact with an inner sealing surface of an upper portion of the fixing unit.

The linear vibrator may further include a damper provided on an inner sealing surface of an upper portion of the fixing unit and formed of an elastic material so as to prevent a contact of the fixing member and the vibration unit induced by linear movements of the vibration unit.

The linear vibrator may further include a lower plate provided on a lower surface of the magnet so as to smoothly form a magnetic flux under the magnet by passing through the coil.

The linear vibrator may further include a magnetic fluid provided to a gap between the magnet and the coil so as to allow for smooth vertical movements of the vibration unit.

The elastic member may be at least any one of a coil spring or a plate spring.

The fixing unit may include a flexible printed circuit board applying power to the coil, and the elastic member may be coupled with the holder and the flexible printed circuit board.

The fixing unit may include an upper case having the magnet generating the magnetic force in an inner space of a certain size and a lower case mounted on a lower portion of the upper case so as to cover the inner space, and the elastic member may be coupled with the holder and the lower case.

The lower case may include a flexible printed circuit board applying power to the coil, and the elastic member may be coupled with the holder and the flexible printed circuit board.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
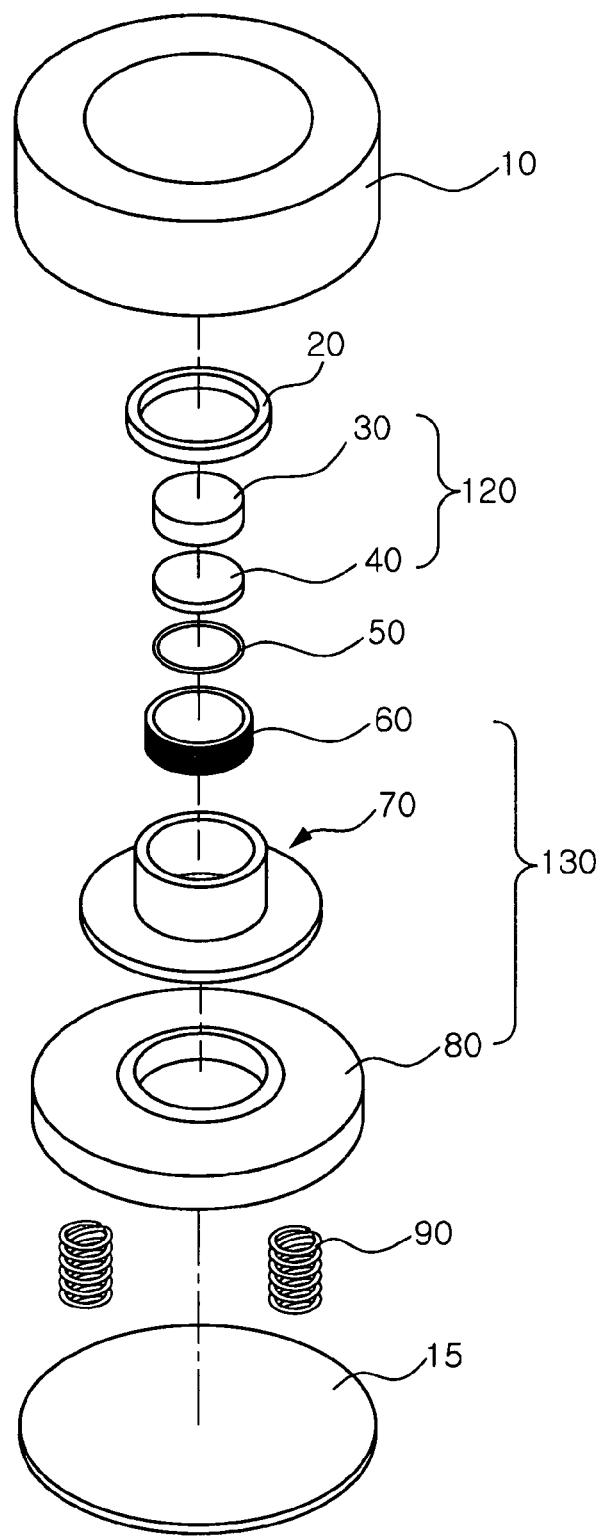
FIG. 1 is an exploded perspective view schematically illustrating a linear vibrator according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Throughout the drawings, the same reference numerals will be used to designate the same or like elements.

Figure 2:
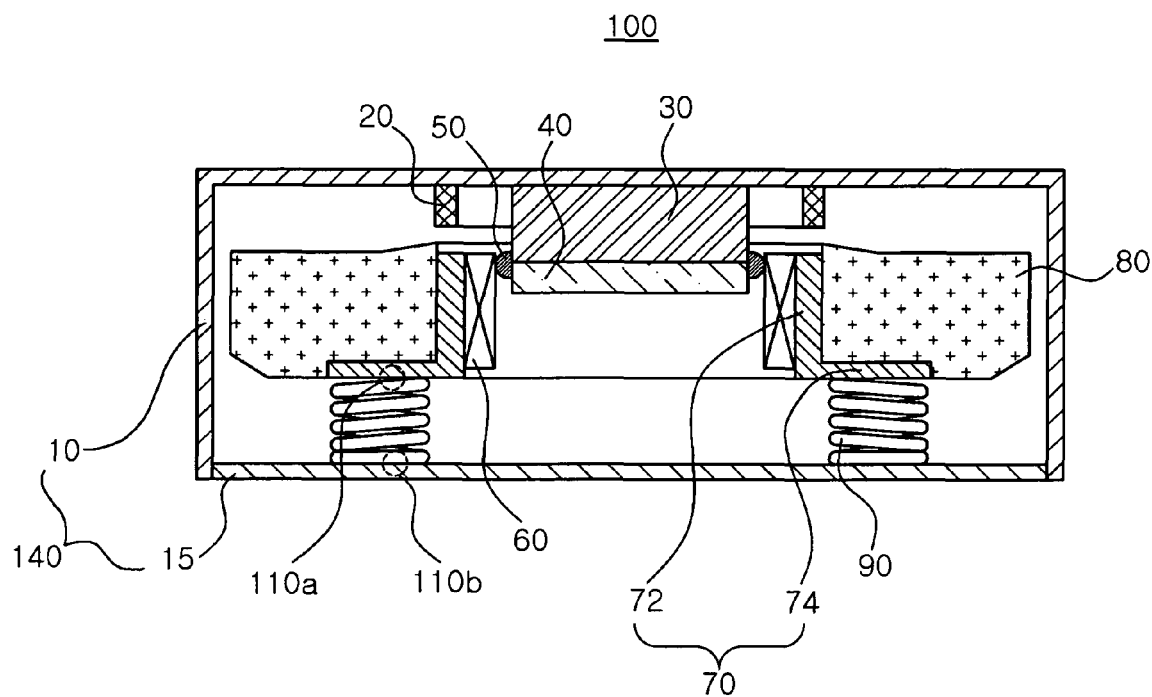
FIG. 2 is a cross-sectional view schematically illustrating a linear vibrator according to an exemplary embodiment of the present invention.
Figure 3:
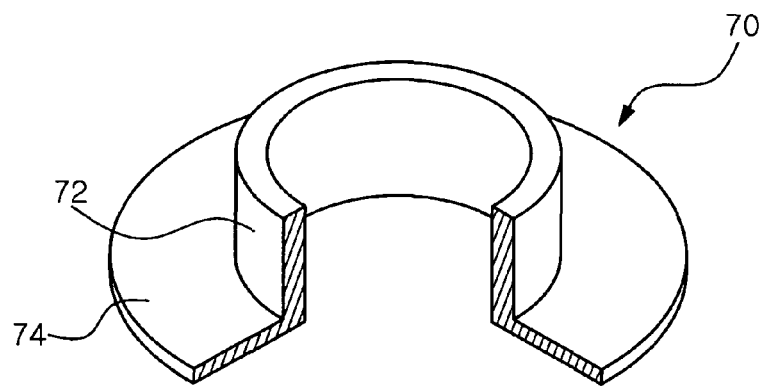
FIG. 3 is a cut-out perspective view schematically illustrating a holder provided in a linear vibrator according to an exemplary embodiment of the present invention.

FIG. 1 is an exploded perspective view schematically illustrating a linear vibrator according to an exemplary embodiment of the present invention. FIG. 2 is a cross-sectional view schematically illustrating a linear vibrator according to an exemplary embodiment of the present invention. FIG. 3 is a cut-out perspective view schematically illustrating a holder provided in a linear vibrator according to an exemplary embodiment of the present invention.

With reference to FIGS. 1 through 3, a linear vibrator 100 may include a fixing unit 140, a magnetic field unit 120, a vibration unit 130 and an elastic member 90.

The fixing unit 140 may be sealed such that an upper case 10 is an accommodation part having an internal space of a certain size and its lower portion being open downwardly is sealed by a lower case 15.

Here, the upper and lower cases 10 and 15 may form an accommodation space of the magnetic field unit 120, the vibration unit 130, and the like to be described below. The upper and lower cases 10 and 15 may be integrally formed.

The magnetic field unit 120 may include a magnet 30 and a lower plate 40. The magnet 30 may be in contact with an inner sealing surface of the upper portion of the upper case 10.

The magnet 30 may be a cylindrical permanent magnet having upper and lower portions magnetized to have different polarities in a vertical direction to generate a magnetic force having a predetermined magnitude. The magnet may be bonded by a bonding material so as to be fixed to the inner sealing surface of the upper portion of the upper case 10.

The lower plate 40 may be provided on a lower surface of the magnet 30 so as to smoothly form a magnetic flux under the magnet 30 by passing through a coil 60 generating electromagnetic force through interaction with the magnet 30.

Also, a magnetic fluid 50 may be coated between the coil 60 and the outer circumferential surfaces of the magnet 30 and the lower plate 40. The magnetic fluid 50 may prevent the abnormal vibrations of the vibration unit 130 to be descried below.

That is, the magnetic fluid 50 may be provided in a gap formed between the magnet 30 and the coil 60 so as to allow for smooth vertical movements of the vibration unit 130. When the vibration unit 130 causes horizontal vibrations in an event that it vibrates from side to side due to an external impact, the magnetic fluid 50 may prevent the horizontal vibrations, allow the vibration unit 130 to vibrate in a linear manner, and prevent a minute vibration phenomenon.

The magnetic fluid 50 is a material characterized by focusing on the magnetic flux of the magnet 30. When the magnetic fluid 50 is applied to a surface of the magnet 30, the magnetic fluid 50 may focus on a position where the magnetic flux of the magnet 30 is generated to thereby form a ring shape.

Here, the magnetic fluid 50 is obtained by stably dispersing magnetic powder in a colloid shape in a liquid and then adding a surfactant thereto to prevent the magnetic powder from being precipitated or coagulated due to gravitation or a magnetic field. For example, the magnetic fluid 50 may include a magnetic fluid obtained by dispersing triiron tetroxide or iron-cobalt alloy molecules in oil or water and, recently, a magnetic fluid obtained by dispersing cobalt in toluene.

The magnetic powder is ultrafine particle powder, has Brownian motion peculiar to ultrafine particles, and has the characteristics that the concentration of the magnetic powder particles in the fluid is uniformly maintained even when an external magnetic field, gravitation, centrifugal force, etc., is applied thereto.

Also, the magnetic fluid 50 fills a gap between an outer surface of the magnet 30 and an inner surface of a hollow of the coil 60, thereby allowing the vibration unit 130 to smoothly vibrate or slide.

The vibration unit 130 may include the coil 60, a holder 70 and a mass body 80. The vibration unit 130 may vibrate vertically by the use of the elastic member 90 to be described below.

The coil 60 may be disposed to face the magnet 30, and part of the magnet 30 may be inserted into a space provided by the coil 60.

Also, the coil 60 may be coupled with an inner surface of a hollow of the holder 70. When current of a certain frequency is applied to the coil 60, a magnetic field may be generated around the coil 60.

Here, when electromagnetic force is formed, the magnetic flux passing through the coil 60 from the magnet 30 is directed horizontally and the magnetic field generated by the coil 60 is formed vertically, so that the vibration unit 130 vibrates vertically. Accordingly, the direction of magnetic flux of the magnet 30 is perpendicular to the vibration direction of the vibration unit 130.

That is, when electromagnetic force having a frequency equivalent to a natural frequency of the vibration unit 130 is applied thereto, the vibration unit 130 may develop resonance vibrations to thereby obtain the maximum amount of vibrations. Here, the natural frequency of the vibration unit 130 is affected by the mass of the vibration unit 130 and the modulus of elasticity of the elastic member 90.

The holder 70 may be coupled with an outer circumferential surface of the coil 60, fixedly support the mass body 80 which vibrates, and have a shape of a hollow cylinder whose upper and lower surfaces are open.

Specifically, the holder 70 may include a vertical portion 72 coupled with the outer circumferential surface of the coil 60 by being in contact therewith and having a shape of a cylinder, and a horizontal portion 74 extending from an end of the vertical portion 72 in an outer diameter direction.

An outer circumferential surface of the vertical portion 72 and an upper surface of the horizontal portion 74 may be in contact with the mass body 80 to fixedly support the mass body 80, and a lower surface of the horizontal portion 74 may be coupled with the elastic member 90 to be described below.

Also, the holder 70 may be formed of iron (Fe). This is intended to facilitate and secure the coupling of the holder 70 and the elastic member 90 by allowing the holder 70 to be formed of the same material as that of the elastic member 90.

However, the material of the holder 70 and the elastic member 90 is not limited to iron (Fe). The holder 70 and the elastic member 90 may be formed of any material, as long as the material allows for the facilitation of secure coupling.

Here, the holder 70 may have an upper coupling portion 110a on a bottom surface thereof such that the upper coupling portion 110a is in contact with the elastic member 90. The upper coupling portion 110a may be a portion where the bottom surface of the holder 70 and the elastic member 90 are coupled by welding.

The mass body 80 is a vibration body being coupled with the outer surface of the vertical portion 72 and the upper surface of the horizontal portion 74 and vibrating vertically. When the mass body 80 vibrates vertically, the mass body 80 may have an outer diameter smaller than an inner diameter of an inner surface of the upper case 10 to allow the mass body 80 to vibrate within the fixing unit 140 without any contact.

In this manner, a gap of a certain size may be formed between the inner surface of the upper case 10 and an outer surface of the mass body 80.

The mass body 80 may be formed of nonmagnetic or paramagnetic substances that are not affected by the magnetic force generated from the magnet 30.

Therefore, the mass body 80 may be formed of a material, such as tungsten, having a greater specific gravity than iron. This is intended to maximize the amount of vibrations by controlling a resonance frequency due to an increase in the mass of the vibration unit 130 within a limited volume.

However, the material of the mass body 80 is not limited to tungsten. The mass body 80 may be formed of various materials according to a designer's intention.

Also, the mass body 80 may be expanded such that the side surface thereof has a further increased mass. This is also intended to maximize the amount of vibrations by increasing the mass within a limited volume.

In order to compensate for the natural frequency of the linear vibrator 100, the mass body 80 may include a space into which a sub-mass body is further inserted, thereby allowing its mass to be increased and decreased.

As described above, the elastic member 90 is coupled with the holder 70 and the lower case 15 and provides elastic force to the vibration unit 130. Also, the elastic member 90 may include a plurality of elastic members. The modulus of elasticity of the elastic member 90 may affect the natural frequency of the vibration unit 130.

One end of the elastic member 90 may be coupled with the bottom surface of the horizontal portion 74 of the holder 70, thereby forming the upper coupling portion 110a.

The upper coupling portion 110a may be a portion where the one end of the elastic member 90 and the bottom surface of the horizontal portion 74 are coupled by welding. As described above, the elastic member 90 and the holder 70 may be formed of the same material, so that the coupling thereof by the welding may be facilitated and secured.

Here, the elastic member 90 may be any one of a coil spring and a plate spring. An example of using the plate spring will be described with reference to FIGS. 4 and 5.

However, the elastic member 90 is not limited to the above-mentioned spring, and it may have various forms as long as it provides elastic force.

The other end of the elastic member 90 may be coupled with a surface of the lower case 15 by welding, thereby forming a lower coupling portion 110b.

A flexible printed circuit board (not shown) may be provided on an upper surface of the lower case 15 so as to make electrical connections with the coil 60. The other end of the elastic member 90 may be coupled with the printed circuit board by welding to thereby form the lower coupling portion 110b.

Meanwhile, a damper 20 may be formed on the inner sealing surface of the upper portion of the upper case 10. The damper 20 may have a structure accommodating the magnet 30.

The damper 20 may be formed of elastic material so as to prevent contact between the vibration unit 130 and the upper case 10 induced by the linear movements of the vibration unit 130. The damper 20 may prevent touch noise that may occur in a case in which the vibration unit 130 excessively vibrates to be in contact with the upper case 10, and also prevent abrasion of the vibration unit 130.

Also, the damper 20 may absorb an external impact to extend the life span of the linear vibrator 100. The damper 20 may be formed of various materials, such as rubber, cork, propylene, or the like, capable of absorbing the impact.

Figure 4:
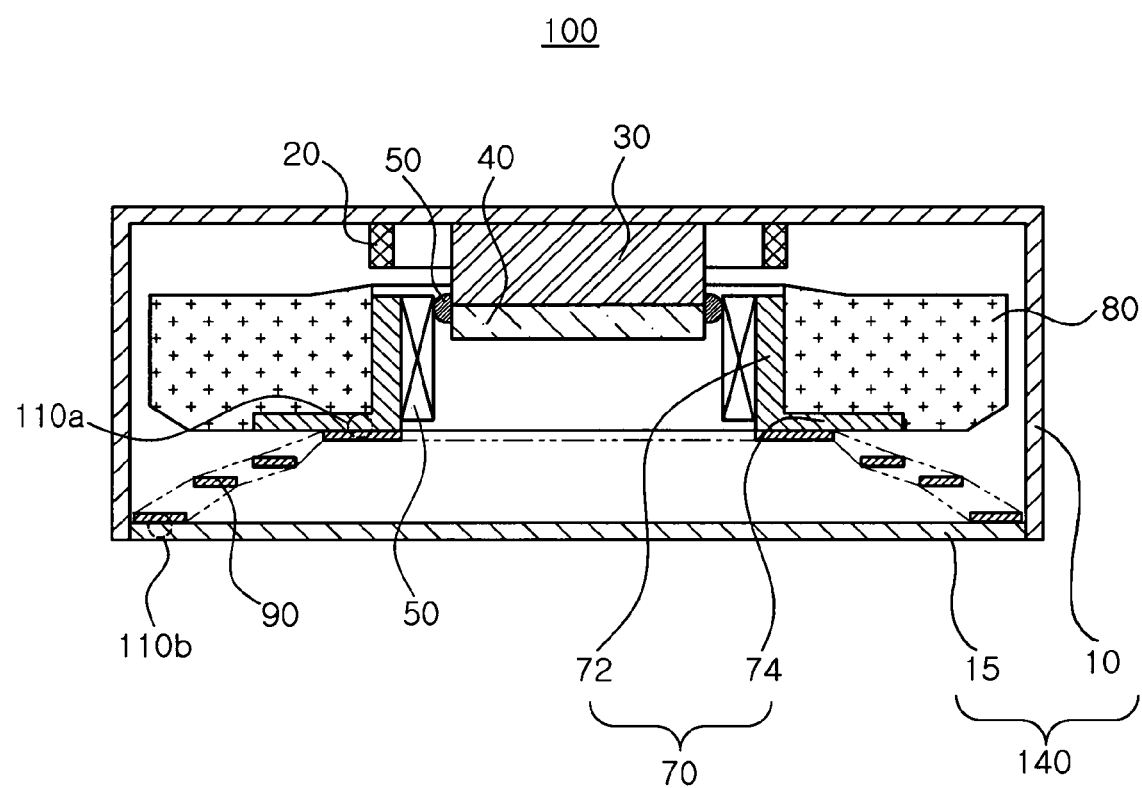
FIG. 4 is a cross-sectional view schematically illustrating a linear vibrator according to another exemplary embodiment of the present invention.
Figure 5:
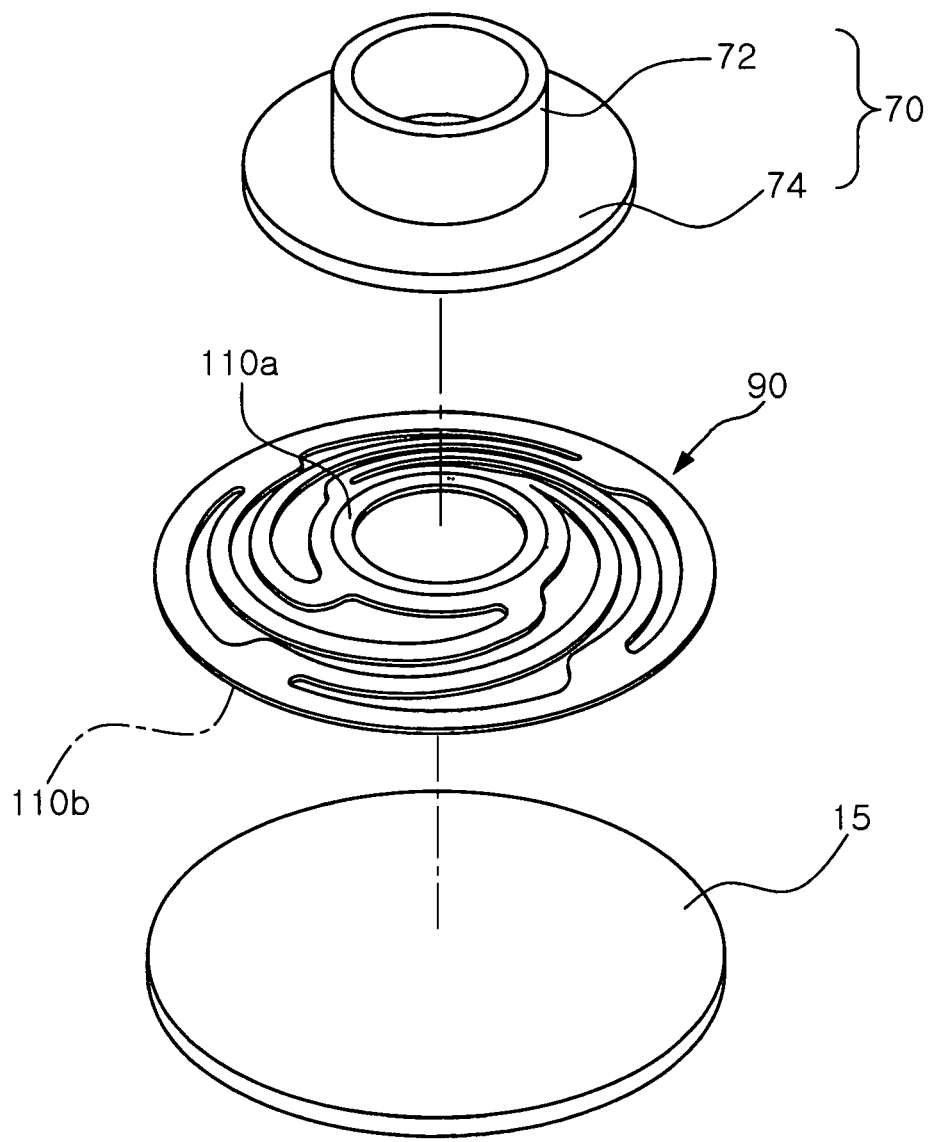
FIG. 5 is an exploded perspective view schematically illustrating the coupling of a holder, an elastic member and a lower case provided in a linear vibrator according to another exemplary embodiment of the present invention.

FIG. 4 is a cross-sectional view schematically illustrating a linear vibrator according to another exemplary embodiment of the present invention. FIG. 5 is an exploded perspective view schematically illustrating the coupling of a holder, an elastic member and a lower case provided in a linear vibrator according to another exemplary embodiment of the present invention.

With reference to FIGS. 4 and 5, the linear vibrator 100 according to another exemplary embodiment of the invention has the same constitution and effect as those of the above-described embodiment with the exception of the elastic member 90, so a detailed description thereof will be omitted.

The elastic member 90 may be a plate spring, and a portion thereof being protruded upwardly may be coupled with the horizontal portion 74 of the holder 70 by welding.

That is, the protruded portion and the horizontal portion 74 may be coupled to form the upper coupling portion 110a. In order to facilitate and secure the coupling of the protruded portion and the horizontal portion 74 by welding, the holder 70 and the elastic member 90, i.e., the plate spring, may be formed of the same material.

A lower portion of the plate spring may be coupled with a surface of the lower case 15 by welding, thereby forming the lower coupling portion 110b.

A flexible printed circuit board (not shown) may be provided on the upper surface of the lower case 15 so as to make electrical connections with the coil. The lower portion of the elastic member 90 may be coupled with the printed circuit board by welding to thereby form the lower coupling portion 110b.

Figure 6:
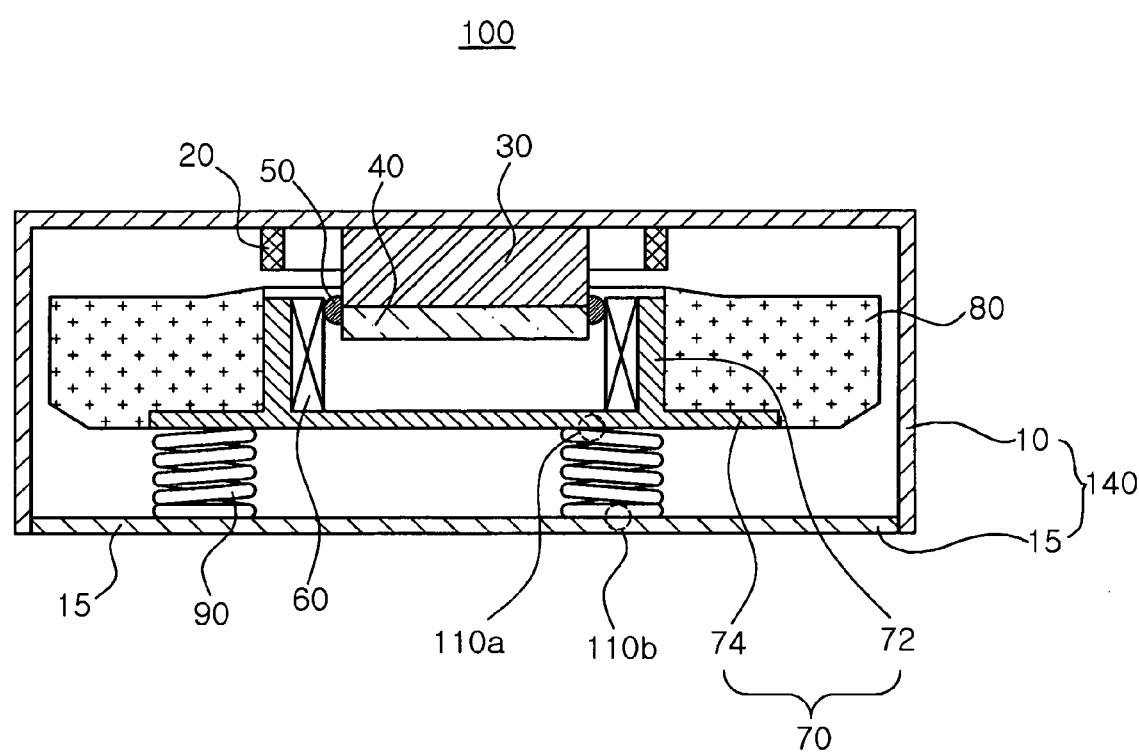
FIG. 6 is a cross-sectional view schematically illustrating a linear vibrator according to another exemplary embodiment of the present invention.

FIG. 6 is a cross-sectional view schematically illustrating a linear vibrator according to another exemplary embodiment of the present invention.

With reference to FIG. 6, the linear vibrator 100 according to another exemplary embodiment of the invention has the same constitution and effect as those of the above-described embodiment with the exception of a coupling structure of the elastic member 90 and the holder 70, so a detailed description thereof will be omitted.

The holder 70 may include the vertical portion 72 being in contact with a surface of the coil 60 and having a shape of a cylinder whose lower portion is sealed, and the horizontal portion 74 extending from an end of the vertical portion 72 in an outer diameter direction.

Therefore, one end of the elastic members 90 may be individually coupled with a bottom surface of the horizontal portion 74 and a bottom surface of the sealed lower portion of the vertical portion 72 by welding and the other end thereof may be coupled with a surface of the lower case 15.

The holder 70 may fixedly support the mass body 80 and the coil 60 and the elastic member 90 may be coupled with the holder 70 and the fixing unit 140 by welding, thereby preventing the vibration unit from making abnormal vibrations and being separated from its preset portion due to an external force. Also, linear vibrations having greater stability may be achieved by preventing the abnormal vibrations of the vibration unit 30.

As set forth above, in a linear vibrator according to exemplary embodiments of the invention, the separation of an elastic member and a vibration unit from their preset positions due to an external force may be prevented.

In addition, a linear vibrator according to exemplary embodiments of the invention may prevent a vibration unit from making abnormal vibrations to thereby achieve more stable linear vibrations and allow the vibration unit to stop the vibrations quickly and stably.

While the present invention has been shown and described in connection with the exemplary embodiments, it will be apparent to those skilled in the art that modifications and variations can be made without departing from the spirit and scope of the invention as defined by the appended claims.

What is claimed is:

1. A linear vibrator comprising:
    a fixing unit having a magnet in an inner space, the magnet generating magnetic force;
    a vibration unit including a coil disposed to face the magnet and generating electromagnetic force by interaction with the magnet, and a holder on a lower surface of a mass body in an axial direction;
    a damper having a ring shape and having an inner circumference which is greater than an outer circumference of the magnet;
    an elastic member coupled with the holder and the fixing unit and providing elastic force to the vibration unit; and
    an upper surface of the elastic member in the axial direction is coupled with a lower surface of the holder in the axial direction by welding.

2. The linear vibrator of claim 1, wherein a lower portion of the holder is sealed.

3. The linear vibrator of claim 2, wherein the elastic member comprising a plurality of elastic members, each of the elastic members is individually coupled with the holder.

4. The linear vibrator of claim 1, wherein the elastic member and the holder are formed of the same material.

5. The linear vibrator of claim 1, wherein the magnet is in contact with an inner sealing surface of an upper portion of the fixing unit.

6. The linear vibrator of claim 1, wherein the damper is provided on an inner sealing surface of an upper portion of the fixing unit and is formed of an elastic material so as to prevent a contact of the fixing member and the vibration unit induced by linear movements of the vibration unit.

7. The linear vibrator of claim 1, further comprising a lower plate provided on a lower surface of the magnet so as to smoothly form a magnetic flux under the magnet by passing through the coil.

8. The linear vibrator of claim 7, further comprising a magnetic fluid provided to a gap between the magnet and the coil so as to allow for smooth vertical movements of the vibration unit.

9. The linear vibrator of claim 1, wherein the elastic member is at least any one of a coil spring or a plate spring.

10. The linear vibrator of claim 1, wherein the fixing unit includes an upper case having the magnet generating the magnetic force in an inner space and a lower case mounted on a lower portion of the upper case so as to cover the inner space, and
    the elastic member is coupled with the holder and the lower case.

11. The linear vibrator of claim 1, wherein the damper has an inner circumference which is greater than an outer circumference of the coil.

12. The linear vibrator of claim 1, wherein the holder, which holds the coil, moves and contacts the damper.

* * * * *